(12) United States Patent
Iizuka et al.

(10) Patent No.: US 9,739,311 B2
(45) Date of Patent: Aug. 22, 2017

(54) BEARING STRUCTURE AND TURBOCHARGER

(71) Applicant: IHI Corporation, Koto-ku (JP)

(72) Inventors: Kuniaki Iizuka, Tokyo (JP); Toshihiko Kitazawa, Tokyo (JP); Masatoshi Eguchi, Tokyo (JP); Yasushi Asada, Tokyo (JP); Osamu Kagimoto, Tokyo (JP); Kenji Ishikawa, Tokyo (JP); Masashige Takahashi, Tokyo (JP); Yohei Suruga, Tokyo (JP); Suguru Katayama, Tokyo (JP); Asako Yasui, Tokyo (JP)

(73) Assignee: IHI Corporation, Koto-ku (JP)

( * ) Notice: Subject to any disclaimer, the term of this patent is extended or adjusted under 35 U.S.C. 154(b) by 395 days.

(21) Appl. No.: 14/568,338

(22) Filed: Dec. 12, 2014

(65) Prior Publication Data

US 2015/0184541 A1    Jul. 2, 2015

(30) Foreign Application Priority Data

Dec. 27, 2013 (JP) .................................. 2013-273186

(51) Int. Cl.
*F16C 33/12* (2006.01)
*F01D 17/16* (2006.01)

(52) U.S. Cl.
CPC .......... *F16C 33/121* (2013.01); *F01D 17/165* (2013.01); *F05D 2220/40* (2013.01); *F05D 2230/90* (2013.01); *F16C 2360/24* (2013.01)

(58) Field of Classification Search
CPC ............................ F16C 33/121; F01D 17/165
See application file for complete search history.

(56) References Cited

U.S. PATENT DOCUMENTS 9,175,578 B2 * 11/2015 Igarashi ................ F01D 17/105
9,429,033 B2 * 8/2016 Martin .................... F01D 17/16
(Continued)

FOREIGN PATENT DOCUMENTS

JP     11-159536      6/1999
JP     2005-351089    12/2005
(Continued)

OTHER PUBLICATIONS

Japanese Office Action issued in Japanese Patent Application No. 2013-273166 dated Jun. 20, 2017.

*Primary Examiner* — Thomas R. Hannon
(74) *Attorney, Agent, or Firm* — Oblon, McClelland, Maier & Neustadt, L.L.P.

(57) ABSTRACT

A shaft includes: two large-diameter portions; and a small-diameter portion formed between the two large-diameter portions. A bearing includes: an annular body in which to insert the shaft; two bearing surfaces being opposite the large-diameter portions; and an intervening surface located between the two bearing surfaces on an inner circumferential surface of the body, and being opposite the small-diameter portion with a clearance formed between the intervening surface and the small-diameter portion. No anti-corrosion treatment is applied to the large-diameter portions. An anti-corrosion treatment is applied to at least any one of: an exposed portion of an outer peripheral surface of the body of the bearing, which is exposed to the outside of the housing; the intervening surface of the bearing; an opposite end surface of the bearing; and the small-diameter portion of the shaft.

2 Claims, 3 Drawing Sheets

(56) References Cited

U.S. PATENT DOCUMENTS

| | | | | |
|---|---|---|---|---|
| 2015/0071762 A1* | 3/2015 | Rentz | ............... | F02B 37/22 |
| | | | | 415/111 |
| 2015/0110607 A1* | 4/2015 | Iizuka | ............... | F04D 17/10 |
| | | | | 415/151 |
| 2015/0184534 A1* | 7/2015 | Yoshida | ............... | B22F 3/225 |
| | | | | 415/159 |
| 2015/0315964 A1* | 11/2015 | Kennedy | ............... | F01D 17/165 |
| | | | | 415/159 |
| 2016/0230586 A1* | 8/2016 | King | ............... | F01D 17/165 |

FOREIGN PATENT DOCUMENTS

| | | |
|---|---|---|
| JP | 2007-321698 | 12/2007 |
| JP | 2009-68375 | 4/2009 |
| JP | 2011-252883 | 12/2011 |
| JP | 2013-163972 | 8/2013 |

* cited by examiner

L ← → R

BEARING STRUCTURE AND TURBOCHARGER

CROSS REFERENCE TO RELATED APPLICATIONS

This application claims priority to Japanese Patent Application No. 2013-273186 filed on Dec. 27, 2013, the entire contents of which are incorporated by reference herein.

BACKGROUND OF THE INVENTION

1. Field of the Invention

The present invention relates to a bearing structure and a turbocharger each including a bearing which is attached to a housing of a turbocharger while penetrating the housing.

2. Background of the Related Art

Variable geometry system turbines have been used for turbochargers and the like. As disclosed in Japanese Patent Application Laid-Open Publication No. 2013-163972, in a variable geometry system turbine, multiple nozzle vanes are disposed annularly in alignment with each other in a passage through which to guide an exhaust gas to a turbine wheel from a scroll passage on the turbine side, and are fixed to their respective vane shafts. The vane shafts are rotatably supported by their respective shaft holes formed in the wall surface of the passage. Depending on how much the nozzle vanes change their angles inside the passage in response to the rotations of the corresponding vane shafts, the area of the passage changes, and the flow rate of the fluid flowing through the passage is accordingly controlled.

The vane shafts are rotated by power from an actuator. A power transmission mechanism is arranged between the actuator and the vane shafts. The power from the actuator is converted by the power transmission mechanism into power which works in either direction in which to rotate the vane shafts. The actuator is provided outside the housing of the turbocharger. In order to transmit the power to the vane shafts situated inside the housing, the power transmission mechanism includes: a bearing which is press-fitted in a through-hole penetrating the housing; and a drive shaft supported by the bearing.

SUMMARY OF THE INVENTION

The attachment of a bearing to the turbocharger while penetrating the housing is not unique to the case of the bearing described in Japanese Patent Application Publication No. 2013-163972, and can be seen in other cases. In a case where such a bearing is used in a turbocharger, the turbocharger is more likely to be exposed to rainwater, seawater or water used for car washing, depending on: where the turbocharger is installed; and what environment an apparatus equipped with the turbocharger is used in. As a result, water is highly likely to enter the clearance between the bearing and the drive shaft supported by the bearing. Furthermore, combination of some engine use conditions increases likelihood that: rust is formed on the sliding surface of the drive shaft which slides in the bearing; and the sliding performance of the drive shaft accordingly deteriorates.

A conceivable measure to counter the problem is to apply anti-corrosion treatment to the outer peripheral surface, the sliding surface, of the drive shaft, which slides in the bearing. However, depending on what type of anti-corrosion treatment is applied and where, the outer diameter of the drive shaft changes, and dimensional precision accordingly decreases in the clearance between the drive shaft and the bearing in the radial directions. This is likely to worsen the sliding performance of the drive shaft.

Furthermore, it has been found from various experiments that so-called rust stains are one major cause of the rust formed on the sliding surface of the drive shaft. According to the experiments, rust is formed on other parts of the bearing, such as its parts exposed to the outside of the housing; thereafter, the rust together with water enters the clearance between the bearing and the drive shaft, and adheres to the drive shaft; and the rust begets rust there.

With this taken into consideration, an object of the present invention is to provide a bearing structure and a turbocharger which include a bearing attached to a housing of the turbocharger with a part of the bearing exposed to the outside of the housing, and which are capable of maintaining dimensional precision of the clearance between the shaft and the bearing in their radial directions while inhibiting the bearing surfaces of the bearing from rusting.

A first aspect of the present invention is a bearing structure. Its gist is as follows. The bearing structure includes: a bearing fixed to a housing of a turbocharger with an end surface side of the bearing inserted in a through-hole provided in the housing, and with an opposite end surface side of the bearing exposed to an outside of the housing; and a shaft rotatably supported by the bearing. The shaft includes: two large-diameter portions formed respectively in two end sides of the shaft in an axial direction of the shaft; and a small-diameter portion formed between the two large-diameter portions, and being smaller in outer diameter than the large-diameter portions. The bearing includes: an annular body in which to insert the shaft; two bearing surfaces formed respectively in two end sides of an inner circumferential surface of the body in the axial direction of the shaft, and being opposite the large-diameter portions; and an intervening surface located between the two bearing surfaces on the inner circumferential surface of the body, and being opposite the small-diameter portion with a clearance formed between the intervening surface and the small-diameter portion. No anti-corrosion treatment is applied to the large-diameter portions, while an anti-corrosion treatment is applied to at least any one of: an exposed portion of an outer peripheral surface of the body of the bearing, which is exposed to the outside of the housing; the intervening surface of the bearing; the opposite end surface of the bearing; and the small-diameter portion of the shaft.

A second aspect of the present invention is a turbocharger. Its gist is as follows. The turbocharger includes: a housing rotatably housing a shaft rod with a turbine wheel provided to an end of the shaft rod, and with a compressor wheel provided to an opposite end of the shaft rod; a bearing fixed to the housing with an end surface side of the bearing inserted in a through-hole provided in the housing, and with an opposite end surface side of the bearing exposed to an outside of the housing; and a shaft rotatably supported by the bearing. The shaft includes: two large-diameter portions formed respectively in two end sides of the shaft in an axial direction of the shaft; and a small-diameter portion formed between the two large-diameter portions, and being smaller in outer diameter than the large-diameter portions The bearing includes: an annular body in which to insert the shaft; two bearing surfaces formed respectively in two end sides of an inner circumferential surface of the body in the axial direction of the shaft, and being opposite the large-diameter portions; and an intervening surface located between the two bearing surfaces on the inner circumferential surface of the body, and being opposite the small-diameter portion with a clearance formed between the intervening surface and the small-diameter portion. No anti-corrosion treatment is applied to the large-diameter portions, while an anti-corrosion treatment is applied to at least any one of: an exposed portion of an outer peripheral surface of the body of the bearing, which is exposed to the outside of the housing; the intervening surface of the bearing; the opposite end surface of the bearing; and the small-diameter portion of the shaft.

The present invention makes it possible for the bearing, which is attached to the housing of the turbocharger with a part of the bearing exposed to the outside of the housing, to maintain the dimensional precision of the clearance between the shaft and the bearing in their radial directions while inhibiting the bearing surfaces of the bearing from rusting.

BRIEF DESCRIPTION OF THE DRAWINGS

FIG. 4A is a front view of the turbocharger, and FIG. 4B is a right side view of the turbocharger.

DESCRIPTION OF THE PREFERRED EMBODIMENTS

Referring to the accompanying drawings, detailed descriptions will be hereinbelow provided for a preferable embodiment of the present invention. Dimensions, materials, concrete values and the like will be given as examples in order to facilitate understanding of the invention, and do not limit the present invention unless otherwise stated. It should be noted that, in the specification and the drawings, components which have virtually the same functions and configurations will be denoted by the same reference signs, and thereby duplicated descriptions will be omitted from the specification. In addition, illustrations of components which have nothing direct to do with the present invention are omitted from the drawings.

Figure 1:
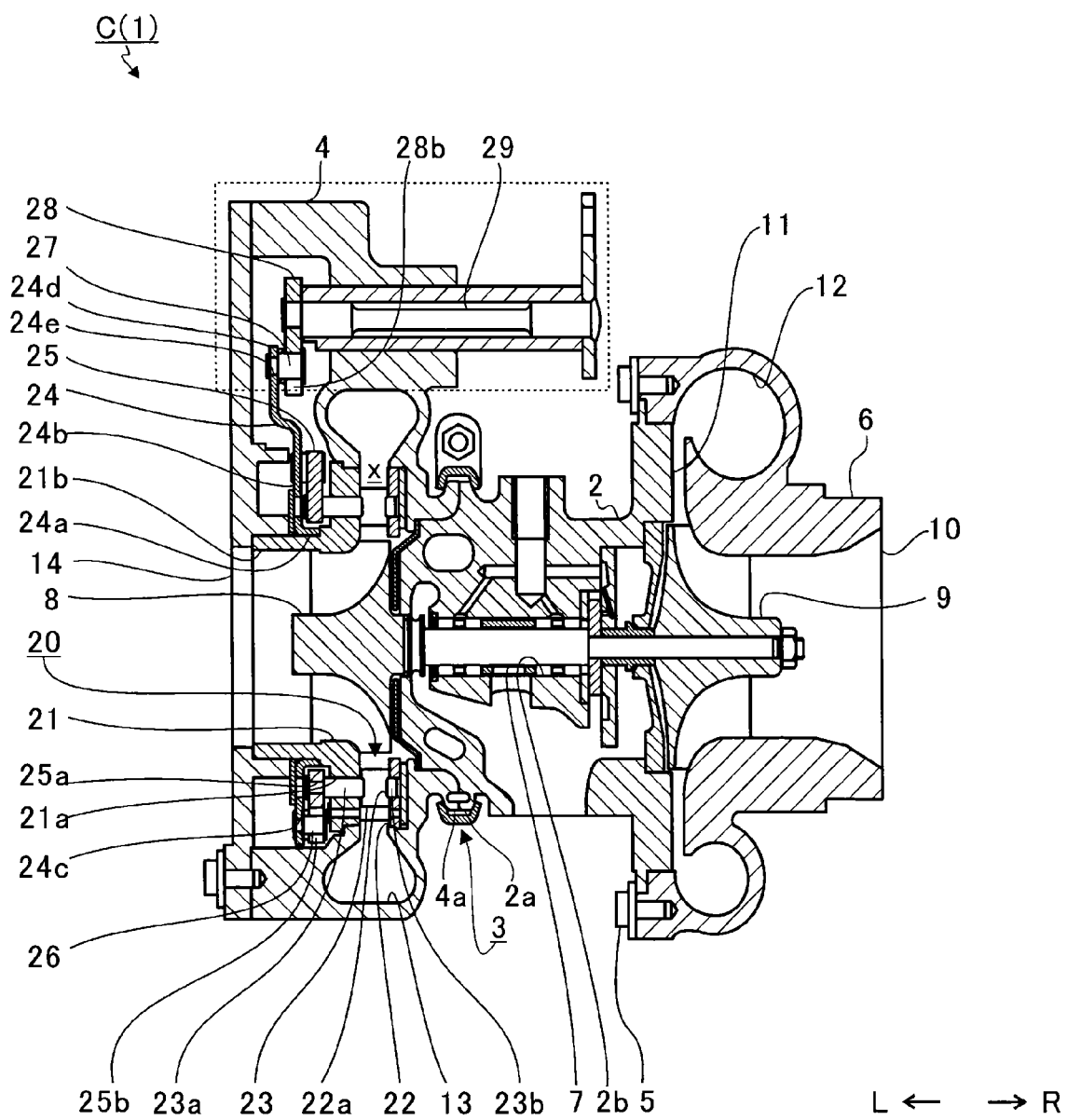
FIG. 1 is a schematic cross-sectional view of a turbocharger of an embodiment of the present invention.

FIG. 1 is a schematic cross-sectional view of a turbocharger C. The following descriptions will be provided with arrow L and R directions in FIG. 1 pointing respectively to the left and right of the turbocharger C. As shown in FIG. 1, the turbocharger C includes a turbocharger body 1. The turbocharger body 1 includes: a bearing housing 2; a turbine housing 4 connected to the left side of the bearing housing 2 with a fastening mechanism 3; and a compressor housing 6 connected to the right side of the bearing housing 2 with fastening bolts 5. These are integrated into one unit.

A protrusion 2a is provided to the outer peripheral surface of the bearing housing 2 near the turbine housing 4. The protrusion 2a juts out from the outer peripheral surface in the radial directions of the bearing housing 2. In addition, a protrusion 4a is provided to the outer peripheral surface of the turbine housing 4 near the bearing housing 2. The protrusion 4a juts out from the outer peripheral surface in the radial directions of the turbine housing 4. The protrusions 2a, 4a are fixed to each other by band fastening using the fastening mechanism 3. Thereby, the bearing housing 2 and the turbine housing 4 are fixed to each other. Incidentally, the fastening mechanism 3 is formed, for example, from a G coupling configured to clamp the protrusions 2a, 4a.

A bearing hole 2b penetrating the bearing housing 2 in the left-right direction of the turbocharger C is formed in the bearing housing 2. A shaft rod 7 is rotatably supported by the bearing hole 2b with a bearing in between. A turbine wheel (impeller) 8 is integrally connected to an end of the shaft rod 7. The turbine wheel 8 is rotatably housed in the turbine housing 4. A compressor wheel (impeller) 9 is integrally connected to the opposite end of the shaft rod 7. The compressor wheel 9 is rotatably housed in the compressor housing 6.

An intake port 10 is formed in the compressor housing 6. The intake port 10 is opened to the right of the turbocharger C, and is connected to an air cleaner (not illustrated). With the bearing housing 2 and the compressor housing 6 connected together with the fastening bolts 5, the opposing surfaces of the two respective housings 2, 6 form a diffuser passage 11 configured to boost the pressure of a fluid. The diffuser passage 11 is shaped like a ring, and extending from the inner to outer sides in the radial directions of the shaft rod 7 (the compressor wheel 9). The inner side of the diffuser passage 11 in the radial directions communicates with the intake port 10 through the compressor wheel 9.

Furthermore, a compressor scroll passage 12 is provided to the compressor housing 6. The compressor scroll passage 12 is shaped like a ring, and is located outward of the diffuser passage 11 in the radial directions of the shaft rod 7 (the compressor wheel 9). The compressor scroll passage 12 communicates with an engine intake port (not illustrated), and concurrently communicates with the diffuser passage 11. For this reason, once the compressor wheel 9 rotates, the fluid is taken into the compressor housing 6 from the intake port 10, and the fluid taken thereinto is guided to the engine intake port after its pressure is boosted by the diffuser passage 11 and the compressor scroll passage 12.

A turbine scroll passage 13 is formed in the turbine housing 4. The turbine scroll passage 13 is shaped like a ring, and is located outward of the turbine wheel 8 in the radial directions of the shaft rod 7. A variable passage x for the fluid to flow through is formed between the turbine wheel 8 and the turbine scroll passage 13. The variable passage x is shaped like a ring, extending from the inner to outer sides in the radial directions of the shaft rod 7 (the turbine wheel 8). Furthermore, nozzle vanes 23, which will be described later, are disposed in the variable passage x.

A discharge port 14 is formed in the turbine housing 4. The turbine housing 4 communicates with the turbine scroll passage 13 through the turbine wheel 8, concurrently faces the front of the turbine wheel 8, and is connected to an exhaust emission control system (not illustrated).

The turbine scroll passage 13 communicates with a gas inlet (not illustrated) to which an exhaust gas exhausted from the engine is guided, and concurrently communicates with the variable passage x. For this reason, the exhaust gas is guided to the turbine scroll passage 13 from the gas inlet (not illustrated), and is thereafter guided to the discharge port 14 through the variable passage x and the turbine wheel 8. The exhaust gas rotates the turbine wheel 8 in its passage process. Rotational force of the turbine wheel 8 is transmitted to the compressor wheel 9 through the shaft rod 7. Thereby, the compressor wheel 9 rotates. The fluid is guided to the engine intake port after its pressures is boosted by rotational force of the compressor wheel 9, as described above.

If the flow rate of the exhaust gas to be guided to the turbine housing 4 changes while the pressure of the exhaust gas is boosted, the amounts of rotation of the turbine wheel 8 and the compressor wheel 9 change. Depending to the operating condition of the engine, the desired pressure-boosted fluid may be unable to be sufficiently guided to the engine intake port in some cases. With this taken into consideration, a variable stator vane mechanism 20 is provided to the variable passage x in the turbine housing 4. The variable stator vane mechanism 20 controls the opening of the passage through which the turbine scroll passage 13 and the discharge port 14 communicate with each other.

The variable stator vane mechanism 20 controls the opening in accordance with the flow rate of the exhaust gas, and thereby changes the flow velocity of the exhaust gas to be guided to the turbine wheel 8. To put it concretely, in a case where the engine speed is low and the flow rate of the exhaust gas is small, the variable stator vane mechanism 20 decreases the opening of the variable passage x, and thereby increases the flow velocity of the exhaust gas to be guided to the turbine wheel 8. In other words, the variable stator vane mechanism 20 makes the turbine wheel 8 able to rotate even with the small flow rate. Descriptions will be hereinbelow provided for the configuration of the variable stator vane mechanism 20.

As shown in FIG. 1, the variable stator vane mechanism 20 includes: a shroud plate 21 forming the left wall surface of the variable passage x; and an opposing plate 22 forming the right wall surface of the variable passage x. The shroud plate 21 and the opposing plate 22 are annular members, and are opposite each other in the axial direction of the shaft rod 7. In other words, a clearance between the shroud plate 21 and the opposing plate 22 in the axial direction of the shaft rod 7 forms the variable passage x.

The shroud plate 21 includes a cylindrical portion 21b shaped like a ring, and extending from its flange portion opposite the opposing plate 22 to the discharge port 14. A part of the shroud plate 21, which continues from the flange portion to the cylindrical portion 21b, forms a shroud wall opposite the outside of the turbine wheel 8 in the radial directions of the turbine wheel 8.

Shroud holes 21a penetrating the shroud plate 21 in the axial direction of the shaft rod 7 are formed in the shroud plate 21. Opposing holes 22a penetrating the opposing plate 22 in the axial direction of the shaft rod 7 are formed in the opposing plate 22 at positions opposite the shroud holes 21a. The shroud holes 21a and the opposing holes 22a are disposed at equal intervals in the circumferential direction of the shaft rod 7.

Each nozzle vane 23 (a control part) is a member whose length in the axial direction of the shaft rod 7 is slightly smaller than the width of the variable passage x in the axial direction of the shaft rod 7. The nozzle vane 23 includes two vane shafts 23a, 23b. The vane shafts 23a, 23b are rotatably supported by the corresponding shroud hole 21a in the shroud plate 21 and the corresponding opposing hole 22a in the opposing plate 22, respectively. Multiple nozzle vanes 23 are disposed in the variable passage x in a way that the nozzle vanes 23 correspond to the shroud holes 21a (the opposing holes 22a), respectively.

A drive ring 24 is disposed outward of the cylindrical portion 21b of the shroud plate 21 in the radial directions. The drive ring 24 includes a cylindrical portion 24a shaped like a ring. The inner peripheral surface of the cylindrical portion 24a is opposite the outer peripheral surface of the cylindrical portion 21b of the shroud plate 21 in the radial directions. In other words, the cylindrical portion 21b of the shroud plate 21 is inserted in the cylindrical portion 24a of the drive ring 24, and the drive ring 24 is capable of rotating relative to the shroud plate 21.

Figure 2:
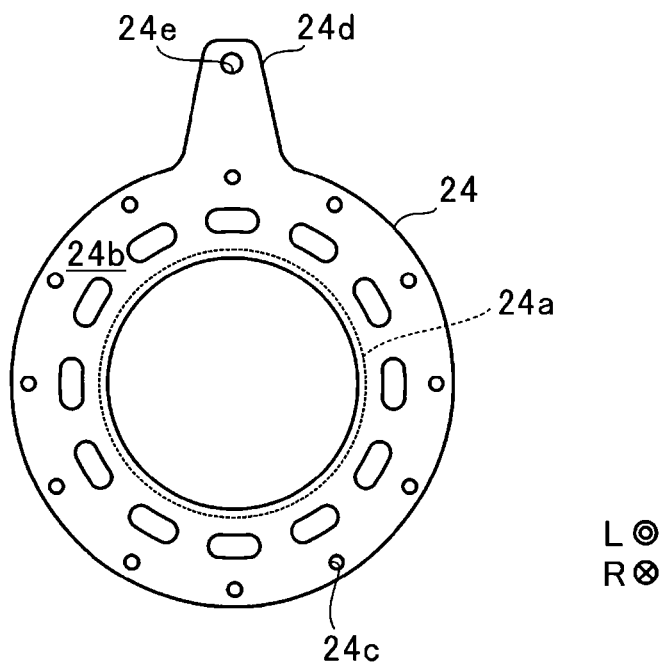
FIG. 2 is a plan view of a drive ring of the embodiment of the present invention, which is viewed from the left in FIG. 1.

FIG. 2 is a plan view of the drive ring 24 viewed from the left in FIG. 1. As shown in FIG. 2, the drive ring 24 includes a flange portion 24b whose outer diameter is larger than that of the cylindrical portion 24a, and which is shaped like a ring. The flange portion 24b extends from an end portion of the cylindrical portion 24a in the radial directions. Multiple ring holes 24c are formed in the flange portion 24b, and arranged at equal intervals in the circumferential direction of the flange portion 24b.

The drive ring 24 includes a protrusion 24d which juts out in the radial directions of the drive ring 24. The protrusion 24d is located on the upper side in FIG. 2. A ring hole 24e penetrating the protrusion 24d in the axial direction of the shaft rod 7 is formed in the protrusion 24d.

As shown in FIG. 1, connectors 25 are disposed in the clearance between the shroud plate 21 and the flange portion 24b of the drive ring 24. The multiple connectors 25 are disposed in the circumferential direction of the cylindrical portion 24a of the drive ring 24.

Figure 3:
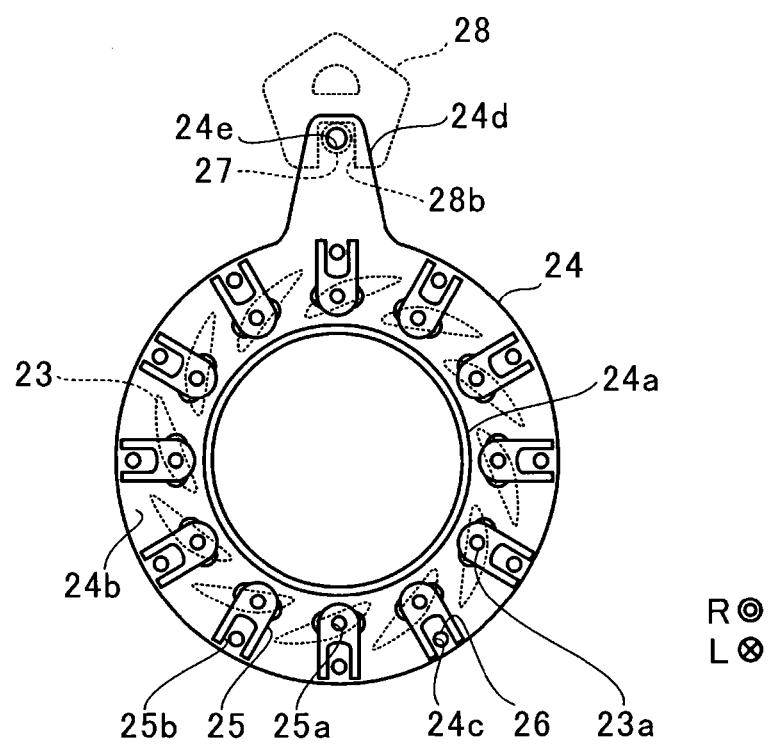
FIG. 3 is a plan view of the drive ring and connectors of the embodiment of the present invention, which are viewed from the right in FIG. 1.

FIG. 3 is a plan view of the drive ring 24 and the connectors 25 viewed from the right in FIG. 1. As shown in FIG. 3, each connector 25 is a member including two arms, and shaped like the letter U. A connection hole 25a penetrating the connector 25 in the axial direction of the shaft rod 7 is formed in the connector 25. As shown in FIG. 1, an end of the corresponding vane shaft 23a is inserted in the connection hole 25a from the right, and is fixed to the connector 25.

Each connector 25 is disposed in a way that an end side of the connector 25, where the connection hole 25a is formed, is directed to the inner side of the cylindrical portion 24a of the drive ring 24 in the radial directions. A connection pin 26 (see FIG. 1) is situated in a clearance 25b between two prongs of the connector 25 which are located on the opposite side of the connector 25. An end of the connection pin 26 is inserted in the corresponding ring hole 24c.

Once the drive ring 24 swings in the circumferential direction of the cylindrical portion 24a, the connection pin 26 inserted in the ring hole 24c comes into contact with the connector 25. As described above, the corresponding vane shaft 23a is fixed to the connection hole 25a in the connector 25, and the vane shaft 23a is rotatably supported the corresponding shroud hole 21a and the corresponding opposing hole 22a. For this reason, once the drive ring 24 further swings in the same direction after the connection pin 26 comes into contact with the connector 25, the connector 25 is pushed by the connection pin 26, and accordingly rotates about the vane shaft 23a. Since the vane shaft 23a is fixed to the connection hole 25a of the connector 25, the vane shaft 23a rotates in accordance with the rotation of the connector 25. As a result, the angle of inclination of the nozzle vane 23 to the direction of the flow of the fluid changes.

As shown in FIG. 1, an end of a projecting pin 27 is inserted in the ring hole 24e in the drive ring 24 from the right. A link plate 28 is disposed on the right side of the protrusion 24d of the drive ring 24. An end of a shaft 29 is inserted in the link plate 28, and the link plate 28 rotates together with the shaft 29.

As shown by a broken line in FIG. 3, a cut is formed in a lower portion of the link plate 28 in FIG. 3. The projecting pin 27 is located in a space 28b in the cut. As the link plate 28 rotates in response to the rotation of the shaft 29, the projecting pin 27 is pushed by the link plate 28, and accordingly swings. Linked to this swing, the drive ring 24 to which the projecting pin 27 is fixed would otherwise swing. However, since the cylindrical portion 21b of the shroud plate 21 is inserted in the cylindrical portion 24a of the drive ring 24, the drive ring 24 rotates in the circumferential direction of the cylindrical portion 24a. As a result, each nozzle vane 23 rotates about its vane shaft 23a with the assistance of the corresponding connector 25, as described above.

The turbocharger C is equipped with an actuator in order to drive the variable stator vane mechanism 20 like this.

Figure 4A:
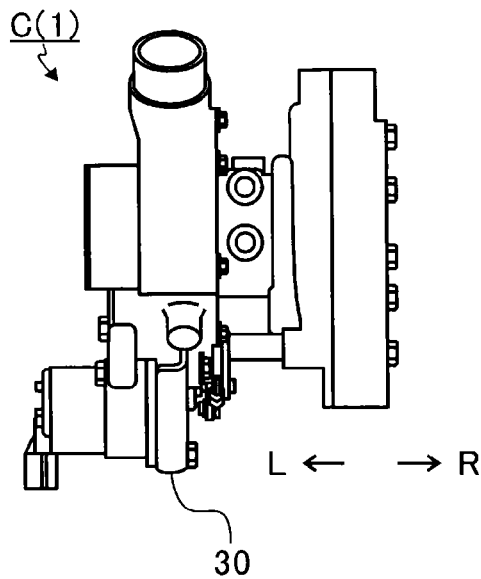
FIGS. 4A and 4B are external views of the turbocharger of the embodiment of the present invention.
Figure 4B:
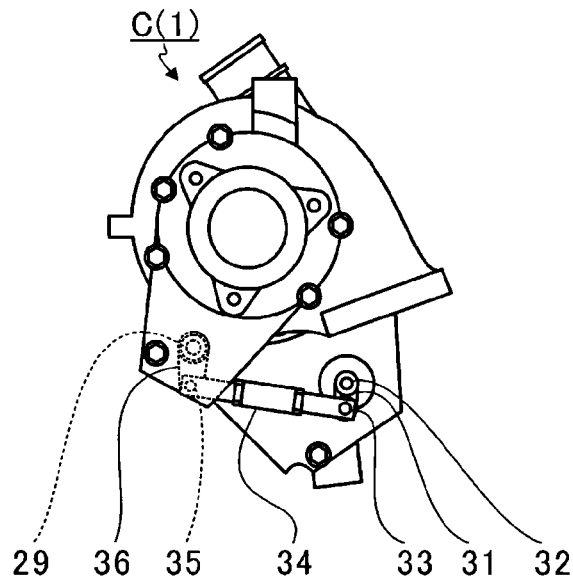

FIGS. 4A and 4B are external views of the turbocharger C. FIG. 4A is a front view of the turbocharger C, and FIG. 4B is a right side view of the turbocharger C. As shown in FIG. 4A, the turbocharger C is provided with an actuator 30 outside the bearing housing 2 and the turbine housing 4.

The actuator 30 is formed from a motor or the like. In accordance with control from a controller (not illustrated), the actuator 30 rotates a fixed shaft 32 fixed to an end of a lever 31 shown in FIG. 4B. An end of a rod 34 is rotatably connected to the opposite end of the lever 31 by means of a movable shaft 33. A lever 36 is s rotatably connected to the opposite end of the rod 34 by means of a movable shaft 35.

Power from the actuator 30 is transmitted to the lever 36 through the lever 31, the fixed shaft 32, the movable shaft 33, the rod 34 and the movable shaft 35.

Figure 5:
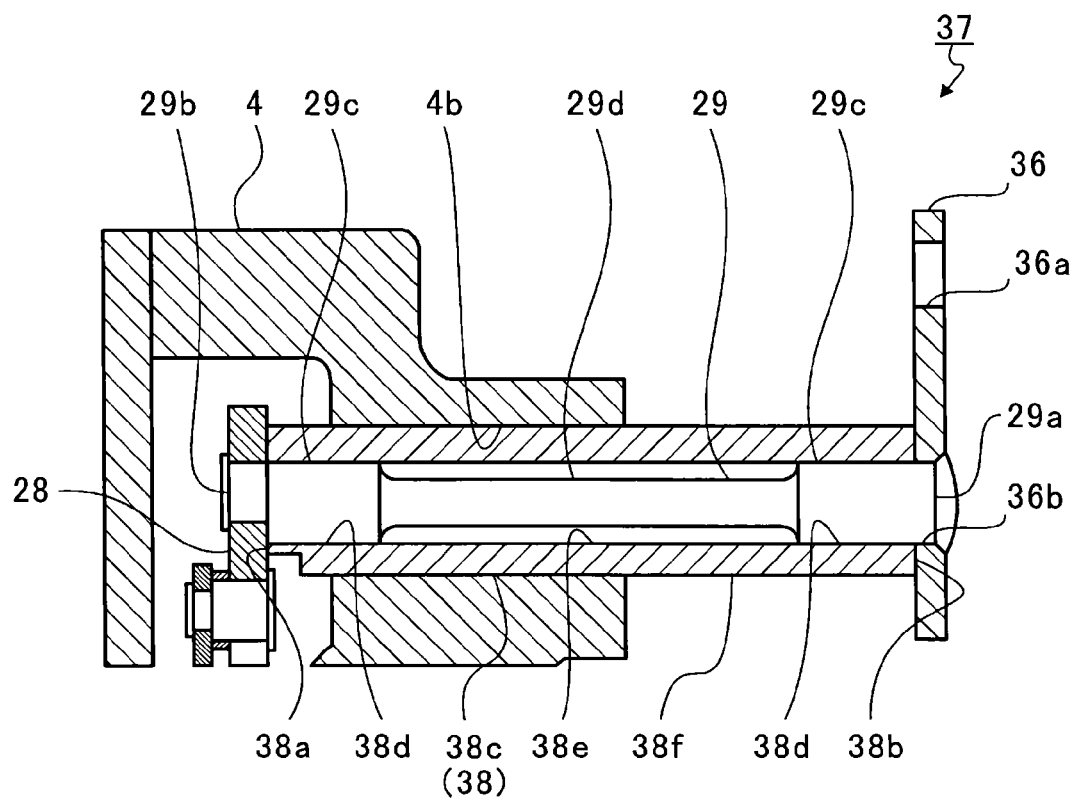
FIG. 5 is an explanatory diagram for explaining a bearing structure of the embodiment of the present invention.

FIG. 5 is an explanatory diagram for explaining a bearing structure 37, a diagram representing a section encircled by a broken line which is extracted from FIG. 1. As shown in FIG. 5, a lever hole 36a penetrating the lever 36 in the axial direction of the shaft 29 is formed in an end side of the lever 36, to which the movable shaft 35 is connected. In addition, a drive hole 36b penetrating the lever 36 in the axial direction of the shaft 29 is formed in an opposite end side of the lever 36.

An end 29a of the shaft 29 is inserted in the drive hole 36b. For example, the shaft 29 is inserted into the drive hole 36b from the left in FIG. 5, and is fixed to the lever 36, which is shown in the right half of FIG. 5, by welding. Accordingly, the lever 36 and the shaft 29 rotate integrally.

The bearing structure 37 includes the shaft 29 and a bearing 38. The bearing 38 is fixed to a through-hole 4b formed in the turbine housing 4. To put it concretely, an end surface 38a side of the bearing 38 is press-fitted into the through-hole 4b. An opposite end surface 38b side of the bearing 38 is exposed to the outside of the turbine housing 4. The shaft 29 is rotatably supported by the bearing 38.

Once the lever 36 rotates about the shaft 29 upon reception of the power from the actuator 30, the shaft 29 accordingly rotates. In response of the rotation of the shaft 29, the link plate 28 fixed to an opposite end 29b side of the shaft 29 swings. As a result, the vane shafts 23a rotate with the assistance of the link plate 28, and the nozzle vanes 23 change their angles in the variable passage x. Thereby, the area of the variable passage x changes.

Detailed descriptions will be provided for the bearing structure 37. The shaft 29 includes two large-diameter portions 29c and a small-diameter portion 29d. The large-diameter portions 29c are formed respectively in the two end sides of the shaft 29 in the axial direction of the shaft 29. The small-diameter portion 29d is formed between the large-diameter portions 29c, and is smaller in outer diameter than the large-diameter portions 29c.

Furthermore, the bearing 38 includes two bearing surfaces 38d (sliding surfaces) which are formed on the inner peripheral surface of its annular body 38c in which to insert the shaft 29. The bearing surfaces 38d are formed respectively in the two end sides of the body 38c in the axial direction of the shaft 29, and are opposite the respective large-diameter portions 29c of the shaft 29.

In addition, an intervening surface 38e is formed on the inner peripheral surface of the body 38c of the bearing 38, but between the two bearing surfaces 38d in the axial direction of the shaft 29. The intervening surface 38e is that which continues to the two bearing surfaces 38d. The intervening surface 38e is opposite the small-diameter portion 29d of the shaft 29 in the radial directions, with a clearance formed between the intervening surface 38e and the small-diameter portion 29d.

Meanwhile, when the turbocharger C is exposed to water, the outer peripheral surface (the outer peripheral portion) of the body 38c of the bearing 38 is splashed with the water at first. What will likely happen next is that the water flows from the outer peripheral surface of the body 38c of the bearing 38 to a side end portion of the lever 36 (a bearing 38-side surface of the lever 36), thereafter moving along the inner peripheral surface of the body 38c of the bearing 38 or along the outer peripheral surface of the shaft 29, eventually entering the inside of the bearing 38. In this case, the outer peripheral potion of the body 38c on the upstream side of the water entrance route, and the side end portion of the lever 36 are very likely to rust because of being in contact with the water. In addition, since the clearance between the inner peripheral surface of the body 38c of the bearing 38 and the outer peripheral surface of the shaft 29 (the clearance in the radial direction) is larger on the intervening surface 38e than on the bearing surfaces 38d, it is more likely that: the water becomes accumulated on the intervening surface 38e; and the intervening surface 38e accordingly rusts. In other words, areas which are possible sources of rust are the outer peripheral portion, the side end portion of the lever 36, and the intervening surface 38e. Once rust occurs on these areas, the rust is highly likely to move to, adhere to, and beget rust (give rise to rust) on, the bearing surfaces 38d of the bearing 38, and the shaft 29. On the other hand, because water once adhering to the bearing surfaces 38d moves to the intervening surface 38e where the clearance is larger, the bearing surfaces 38d are less likely to rust than the intervening surface 38e.

With this taken into consideration, the embodiment applies anti-corrosion treatment to: an exposed portion 38f of the outer peripheral surface of the body 38c of the bearing 38, which is exposed to the outside of the turbine housing 4; the intervening surface 38e of the bearing 38; the opposite end surface 38b of the bearing 38; and the small-diameter portion 29d of the shaft 29. The anti-corrosion treatment includes: a treatment for forming an antioxidant film on their surfaces; and a treatment for modifying their surface structures in order to enhance their resistance to oxidation.

It should be noted that the anti-corrosion treatment may be applied to the entirety of the outer peripheral surface of the body 38c of the bearing 38.

On the other hand, no anti-corrosion treatment is applied to the large-diameter portions 29c of the shaft 29. In other words, the surfaces of the large-diameter portions 29c have virtually the same surface structure as that of the small-diameter portion 29d has before the anti-corrosion treatment is applied to the small-diameter portion 29d. To put it in other words, the materials of the large-diameter portions 29c are exposed onto the surfaces of the large-diameter portions 29c.

In sum, since the anti-corrosion treatment is applied to the areas which are more likely to rust, the bearing surfaces 38d of the bearing 38 is inhibited from rusting. Further, since no anti-corrosion treatment is applied to the bearing surface 38d and the large-diameter portions 29c, it is possible to maintain the dimensional precision of the clearance between the shaft 29 and the bearing 38 in the radial directions.

The foregoing embodiment has described the case where the anti-corrosion treatment is applied to all of: the exposed portion 38f of the outer peripheral surface of the body 38c of the bearing 38, which is exposed to the outside of the turbine housing 4; the intervening surface 38e of the bearing 38; the opposite end surface 38b of the bearing 38; and the small-diameter portion 29d of the shaft 29. Nevertheless, the anti-corrosion treatment may be applied to at least any one of: the exposed portion 38f of the outer peripheral surface of the body 38c of the bearing 38, which is exposed to the outside of the turbine housing 4; the intervening surface 38e of the bearing 38; the opposite end surface 38b of the bearing 38; and the small-diameter portion 29d of the shaft 29.

In addition, as long as no anti-corrosion treatment is applied to the large-diameter portions 29c of the shaft 29, the anti-corrosion treatment may be applied to the entirety of the inner peripheral surface of the bearing 38, inclusive of the bearing surfaces 38d, within an extent that enables the dimensional precision of the clearances between the large-diameter portions 29c and the bearing surfaces 38d to be maintained.

Furthermore, the foregoing embodiment has described the case where the bearing structure 37 supports the shaft 29 configured to transmit the power to the variable stator vane mechanism 20. Nevertheless, the bearing structure may support a shaft in another part of the turbocharger, as long as the bearing structure includes a bearing which is fixed to the housing of the turbocharger while penetrating the housing with a part of the bearing exposed to the outside of the housing. For example, the bearing structure of the present invention may be constructed in order to support a shaft configured to transmit power for opening and closing a waste gate valve. Furthermore, the bearing structure of the present invention may be constructed in order to support a shaft configured to transmit power for operating a valve for switching the supply of the exhaust gas to multiple turbochargers.

Moreover, for example, the bearing structure of the present invention may be constructed in order to support a shaft configured to transmit power for an air bypass valve which is provided to the compressor housing and configured to open and close a bypass passage for the exhaust gas to bypass an intake passage. In addition, the bearing structure of the present invention may be constructed in a turbine housing including two turbine scroll passages, in order to support a shaft configured to transmit power to a valve for opening and closing an inlet port for the exhaust gas to flow through to either of the two turbine scroll passages.

In all of the cases, the shaft, a part of the configuration of the bearing structure, transmits the rotational power to a flow-rate variable mechanism such as the variable stator vane mechanism 20, the waste gate valve or the air bypass valve, and thereby changes the flow rate and flow velocity of the gas which is taken into the housing of the turbocharger C, or the gas which is discharged to the outside of the housing of the turbocharger C.

Although, referring to the accompanying drawings, the foregoing descriptions have been provided for the preferred embodiment of the present invention, it goes without saying that the present invention is not limited to such an embodiment. It is clear that those skilled in the art will be able to arrive at various modifications and changes within a scope recited in claims. It is natural that such modifications and changes be understood as belonging to the technical scope of the present invention.

What is claimed is:

1. A bearing structure comprising:
   a bearing fixed to a housing of a turbocharger with an end surface side of the bearing inserted in a through-hole provided in the housing, and with an opposite end surface side of the bearing exposed to an outside of the housing; and
   a shaft rotatably supported by the bearing, wherein
   the shaft includes
      two large-diameter portions formed respectively in two end sides of the shaft in an axial direction of the shaft, and
      a small-diameter portion formed between the two large-diameter portions, and being smaller in outer diameter than the large-diameter portions,
   the bearing includes
      an annular body in which to insert the shaft,
      two bearing surfaces formed respectively in two end sides of an inner circumferential surface of the body in the axial direction of the shaft, and being opposite the large-diameter portions, and
      an intervening surface located between the two bearing surfaces on the inner circumferential surface of the body, and being opposite the small-diameter portion with a clearance formed between the intervening surface and the small-diameter portion, and
   no anti-corrosion treatment is applied to the large-diameter portions, while an anti-corrosion treatment is applied to at least any one of: an exposed portion of an outer peripheral surface of the body of the bearing, which is exposed to the outside of the housing; the intervening surface of the bearing; the opposite end surface of the bearing; and the small-diameter portion of the shaft.

2. A turbocharger comprising:
   a housing rotatably housing a shaft rod with a turbine wheel provided to an end of the shaft rod, and with a compressor wheel provided to an opposite end of the shaft rod;
   a bearing fixed to the housing with an end surface side of the bearing inserted in a through-hole provided in the housing, and with an opposite end surface side of the bearing exposed to an outside of the housing; and
   a shaft rotatably supported by the bearing, wherein
   the shaft includes
      two large-diameter portions formed respectively in two end sides of the shaft in an axial direction of the shaft, and
      a small-diameter portion formed between the two large-diameter portions, and being smaller in outer diameter than the large-diameter portions,
   the bearing includes
      an annular body in which to insert the shaft,
      two bearing surfaces formed respectively in two end sides of an inner circumferential surface of the body in the axial direction of the shaft, and being opposite the large-diameter portions, and an intervening surface located between the two bearing surfaces on the inner circumferential surface of the body, and being opposite the small-diameter portion with a clearance formed between the intervening surface and the small-diameter portion, and no anti-corrosion treatment is applied to the large-diameter portions, while an anti-corrosion treatment is applied to at least any one of: an exposed portion of an outer peripheral surface of the body of the bearing, which is exposed to the outside of the housing; the intervening surface of the bearing; the opposite end surface of the bearing; and the small-diameter portion of the shaft.

* * * * *